United States Patent
Sonzogni

(10) Patent No.: US 12,287,534 B2
(45) Date of Patent: Apr. 29, 2025

(54) SPECTACLE LENS EDGE SIMULATION TOOL AND METHOD FOR DEFINING A LENS SHAPE WITH SAID TOOL

(71) Applicant: MEI S.r.l., Bergamo (IT)

(72) Inventor: Stefano Sonzogni, Bergamo (IT)

(73) Assignee: MEI S.r.l., Bergamo (IT)

( * ) Notice: Subject to any disclaimer, the term of this patent is extended or adjusted under 35 U.S.C. 154(b) by 824 days.

(21) Appl. No.: 17/420,773

(22) PCT Filed: Jan. 9, 2020

(86) PCT No.: PCT/EP2020/050412
§ 371 (c)(1),
(2) Date: Jul. 6, 2021

(87) PCT Pub. No.: WO2020/144268
PCT Pub. Date: Jul. 16, 2020

(65) Prior Publication Data
US 2022/0113555 A1    Apr. 14, 2022

(30) Foreign Application Priority Data
Jan. 10, 2019  (EP) .................................. 19151096

(51) Int. Cl.
*G02C 1/00*      (2006.01)
*G01B 21/20*   (2006.01)
(52) U.S. Cl.
CPC .............. *G02C 1/10* (2013.01); *G01B 21/20* (2013.01)
(58) Field of Classification Search
CPC .. G02C 1/10; G01B 21/20; G01B 5/18; B24B 9/146
See application file for complete search history.

(56) References Cited

U.S. PATENT DOCUMENTS 6,315,642 B1    11/2001   Jean-Jacques et al.
6,588,898 B2 *   7/2003   Iwai ........................ B24B 49/02
                                                                  351/158

(Continued)

FOREIGN PATENT DOCUMENTS

EP         0092364 A1      10/1983
GB         2406647 A        4/2005
KR     101169130 B1 *      7/2012

OTHER PUBLICATIONS

International Search Report issued in connection with the corresponding International Application No. PCT/EP2020/050412 on Apr. 17, 2020.

(Continued)

*Primary Examiner* — Wyatt A Stoffa
*Assistant Examiner* — Ray Alexander Dean
(74) *Attorney, Agent, or Firm* — The H.T. Than Law Group

(57) ABSTRACT

The present invention relates to a lens edge simulation tool (10) for measuring the fitment of a lens edge profile (LEP) with respect to a frame groove profile (FGP) of a spectacle frame (20), the lens edge simulation tool (10) having a defined edge profile (STP) like a lens edge profile (LEP) of a lens (6) being machined by a defined edger machine (4), the defined edge profile (STP) comprising a bevel portion (11) protruding towards a protrusion direction (A), wherein the lens edge simulation tool (10) further comprises a probe (15) provided at a distal end tip portion (14) of the bevel portion (11) and being moveable (M) along the protrusion direction (A) between a retracted position in which the probe (15) does not protrude from the defined edge profile (STP) and an extension position in which the probe (15) protrudes from the distal end tip portion (14). The present invention further relates to a system (1) and method for defining a lens (Continued)

shape for a machined lens (6) adapted to fit into a frame groove (21) of a spectacle frame (20).

20 Claims, 3 Drawing Sheets

(56) References Cited

U.S. PATENT DOCUMENTS

| 8,295,961 | B2 | 10/2012 | Takashi et al. |
| 2001/0035933 | A1* | 11/2001 | Iwai .................. B24B 9/148 |
| | | | 351/41 |

OTHER PUBLICATIONS

European Search Report issued in connection with the corresponding European Application No. 19 15 1096 on Jul. 10, 2019.

* cited by examiner

SPECTACLE LENS EDGE SIMULATION TOOL AND METHOD FOR DEFINING A LENS SHAPE WITH SAID TOOL

FIELD OF THE INVENTION

The present invention relates to a lens edge simulation tool for measuring the fitment of a lens edge profile with respect to a frame groove profile of a spectacle frame, a system for defining a lens shape for a machined lens adapted to fit into a frame groove of a spectacle frame using the lens edge simulation tool, and a method for defining a lens shape for a machined lens adapted to fit into a frame groove of a spectacle frame using a lens edge simulation tool.

BACKGROUND OF THE INVENTION

In the prior art it is well known to measure or trace a frame groove periphery of a frame groove—also known as bezel often having a V-shape in cross-section—of a spectacle frame (ring) to thus retrieve corresponding data representing the circumferential contour of the bezel. The step of measuring the frame groove periphery or even frame groove profile is usually done with a so-called tracer having a mechanical probe which is introduced into the bezel and moved once around its periphery. The so received frame groove periphery data is then transferred to an edger machine for machining a spectacle lens—i.e. a defined lens edge profile and periphery based on the frame groove profile and periphery to result in a lens shape to fit in the measured frame groove of the spectacle frame. The data transferred from the tracer to the edger machine of different manufacturers is usually done based on the DCS VCA standard. However, it is often under the experience of the optician to evaluate the need of compensation of the frame groove periphery measured by the tracer to allow for a proper fit of a machined lens having a defined lens edge.

In a case in which—in a cross-sectional view—the bevel portion of the lens edge does not perfectly sit in a position which complies with the contour of the spectacle frame measured by the tracer—i.e. usually at or on a bottom of the spectacle frame groove —, the lens might not perfectly fit in the frame groove but might be too loosely or too strongly fit into the frame groove or might not even fit into the frame groove at all which requires rework of the lens or may even result in a deficient product. This comes about since the tracer usually measures the bottom of the frame groove while the edger machine is calibrated to adjust the top of the bevel.

There are even known physical or digital methods of measuring the frame groove profile which is then combined with a V-shaped measuring tool to define a potential positioning of a most protruding area of a lens edge profile, while a possible offset between the bottom of the frame groove and the introduction depth of the V-shaped portion could only be measured by a corresponding reference surface which requires an additional feature as well as additional calibrating steps. This method has the further disadvantage that it requires the use of a special machine while not allowing the use of different and probably common and already present tracers and edger machines. Moreover, as the V-shape does not represent the lens edge profile and since a possible offset requires a separate calibrating step for every single lens, the known procedures of the prior art are quite complex and requires specific, complex and costly machines which are not compatible with other machines while not providing sufficiently satisfying results to best reduce the number of deficient products.

SUMMARY OF THE INVENTION

It is thus an object of the present invention to provide a tool, a system and a method, which allow an exact definition of a lens shape or its lens edge profile adapted to fit into a frame groove (profile) of a spectacle frame while allowing the use of different tracers and edging machines as best required for the corresponding lens to be machined.

This object is achieved by the subject-matter of the independent claims. The dependent claims study further the central idea of the present invention.

According to a first aspect, the present invention relates to a lens edge simulation tool for measuring the fitment of a lens edge profile with respect to a frame groove profile of a spectacle frame (e.g. having a V-shape in cross-section). The lens edge simulation tool has a defined edge profile like a lens edge profile of a lens being machined by a defined edger machine. The defined edge profile comprises a bevel portion protruding towards a protrusion direction. The lens edge simulation tool further comprises a probe provided at a distal end tip portion of the bevel portion and being moveable along the protrusion direction between a retracted position in which the probe does not protrude from the defined edge profile and an extension position in which the probe protrudes from the defined edge profile or the distal end tip portion, i.e. towards the protrusion direction.

The lens edge simulation tool thus simulates the profile of a corresponding lens edge which would be machined by a corresponding edger machine. This profile can have different but well known shapes which comprise at least the defined bevel portion. Hence, the user can use a lens edge simulation tool which—with respect to its profile—can be provided such that it corresponds to the edger machine being actually present at the production location. With the integrated and axially moveable probe it is possible to directly measure a gap between the distal end tip portion of a correspondingly machined lens to be fit into said frame groove and the bottom of the frame groove, i.e. an offset of a frame groove profile in which the lens edge simulation tool is fit and the distal end tip portion of the bevel portion of a corresponding lens edge due to the extension of the probe. Hence, there is no need to calibrate any measuring tools as the offset is directly measured from and in the frame groove. The data of the measured offset can then be used to compensate the gained frame groove periphery data received by a tracer in a tracing step and to thus result in a most accurate lens edge periphery or contour to be edged by a corresponding edger machine. As the lens edge simulation tool takes into account any possible contact points and interference of the lens to be machined, it perfectly simulates the lens edge profile thus allowing an accurate measurement of the gap/offset under realistic conditions. The lens edge simulation tool also allows a static measurement at one or a limited number of positions along the frame groove periphery to receive highly accurate results to allow a lens be machined with dimensions and shape able to properly fit into a spectacle frame. Hence, a circumferential measurement which bears the risk of the tool to slip out of the groove and requires costly driving units can be avoided.

The "frame groove periphery" is the circumferential line preferably measured at the bottom of the frame groove. "Lens edge periphery" is the circumferential line measured at the lateral edge—preferably the outermost protruding section of the lens edge contour—of a lens. The "lens edge profile", the "frame groove profile" and the "defined edge profile" are the cross-sectional contours of the respective portions (i.e. lens edge, frame groove, lens edge simulation tool edge, respectively).

The defined edge profile may further comprise two lateral portions each facing towards the protrusion direction and extending at opposite sides of the bevel portion and away from one another (preferably substantially extending orthogonal to the extension direction). These additional lateral portions further allow the lens edge simulation tool or better the defined edge profile to simulate a lens edge profile of a lens being machined by the defined edger machine even for cases in which the lens has a considerable thickness being thicker than the base of the bevel portion.

The probe may have the same dimensions, preferably the same shape and/or size, like a tracer pin of a tracer for determining a frame groove periphery. In a preferred embodiment, the probe is identical to such a tracer pin. For instance, the probe can have a spherical or partially spherical or hemispherical or rounded shape, more preferably having a diameter of 0.1 to 4 mm, more preferred 0.2 to 2 mm. In other words, the probe being similar or even identical to a corresponding tracer pin allows to use any kind of tracer while the position of the probe in a spectacle frame groove to be measured would be identical to the position of the corresponding tracer pin of a tracer for determining said frame groove periphery so that the measured data or offset can directly be used to define a potential compensation of the frame groove periphery to result at a lens edge periphery.

The probe may be biased towards the extension position. This may allow for the probe always to be securely fit in the frame groove and particularly onto the surface to be measured to thus result in high accuracy of the measurement.

Moreover, the probe may be releasably provided to the defined edge profile or its bevel portion. This allows the lens edge simulation tool to be adapted to a corresponding tracer being used (e.g. having a particular tracer pin layout) by simple replacement. This further increases the flexibility of the lens edge simulation tool to be used for any kind of different machines (e.g. tracers and edger machines).

The bevel portion tapers towards the protrusion direction and thus best simulates a real bevel portion of a lens edge profile of a lens to be machined by a defined edger machine. In a preferred embodiment, the bevel portion may have a tapered V-shape.

According to another aspect, the present invention further relates to a system for defining a lens shape for a machined lens adapted to fit into a frame groove of a spectacle frame. The system comprises a holder for holding a spectacle frame. Moreover, the system further comprises a lens edge simulation tool according to the present invention. The lens edge simulation tool is provided such that it can be introduced with its bevel portion and probe into a frame groove of the spectacle frame held by the holder at least at one position along a frame groove periphery preferably so that the lens edge simulation tool rests on the spectacle frame in the protrusion direction and the probe rests on (i.e. on or closest possible to) the bottom of the frame groove. The use of the lens edge simulation tool allows for a severe simplification of such a system compared to known systems requiring much more complex devices and algorithms.

The holder can be a separate element or it can also be provided by the lens edge simulation tool itself as long as it allows—due to its layout and/or orientation—to hold/support a spectacle frame for the required (static) measurement.

The lens edge simulation tool might be supported in a tiltable manner and preferably in a freely tiltable manner. The lens edge simulation tool might be tiltable at least about an axis extending orthogonally to the protrusion direction in side view of the lens edge simulation tool and preferably also orthogonal to the extension direction of the lateral portions. This tiltable or even freely tiltable support of the lens edge simulation tool allows the latter to automatically and perfectly oriented introduce with its bevel portion into a corresponding frame groove to be measured. In particular, the planes of osculation of the lens edge simulation tool on the one side and the frame groove on the other side can be (automatically) aligned and thus easily position to receive most accurate measuring results. Of course, it is also possible that a frame is correspondingly tiltable (e.g. via the holder) so that a relative tilting between frame and lens edge simulation tool allows for an accurate alignment of their orientations with respect to each other. As a tracer can at most measure a 3D linear profile, it is not possible to calculate the final inclination of the frame groove. The measurement solution of the present system or lens edge simulation tool allows for the frame and the lens edge simulation tool to "naturally" assume the proper relative tilt with respect to each other due to the given frame groove profile and lens shape profile. This may allow for a minimum offset present and thus proper fit when fitting the so machined lens into the given spectacle frame.

The system may further comprise a tracer for determining the frame groove periphery at a bottom of the frame groove of the spectacle frame. The tracer can be a integrated or separate element which allows the user to use any kind of tracer thus increasing the flexibility of the system. For determining the frame groove periphery, the spectacle frame may preferably be held by the holder. The frame groove periphery may preferably further be determined by relative movement of the tracer with respect to the holder or spectacle frame. The tracer may comprise a camera. Alternatively or additionally, the tracer may also comprise a tracer pin configured to rest at the bottom of the frame groove during determination of the frame groove periphery and preferably during the relative movement. As already mentioned above, the probe and the tracer pin might have the same shape and/or size and are preferably identical. All of these features allow for a sufficient and satisfying measurement of the frame groove periphery.

The system may further comprise an edger machine having an edging profile for machining the defined lens edge profile. Such edging profile usually comprises a groove (e.g. a V-shape groove) representing the negative layout or contour of the lens edge profile to be machined. The edger machine may therefore comprise a roughening or bevelling wheel. Any type of known edger machines can be used thus increasing the flexibility of the system.

The system may further comprise a control unit preferably for controlling the holder and/or the lens edge simulation tool and/or the tracer and/or the edger machine. The control unit might also be configured for controlling a relative movement of the holder with respect to the lens edge simulation tool and/or the tracer, and/or for controlling a relative movement of a lens to be machined with respect to the edger machine. The system and all related devices may thus be automatically or semi-automatically used.

The control unit may further be configured to provide and/or determine data, like a lens shape compensation value, representing an offset of the lens edge simulation tool introduced in the frame groove with respect to the bottom of the frame groove based on the extension position of the probe with respect to the retracted position or distal end tip portion and preferably based on data received from the lens edge simulation tool. The control unit may further be configured to provide and/or determine also data representing the frame groove periphery and more preferred based on data received from the tracer. The control unit may further be configured to provide and/or determine also data representing a lens edge periphery of a machined lens preferably based on the frame groove periphery in conjunction with the determined offset or shape compensation value. The data representing the lens edge periphery of the machined lens may further be based on data representing the relative tiltable angle of the lens edge simulation tool; preferably with respect to a defined default orientation. The control unit might also be configured to provide said data to the edger machine, wherein the edger machine is preferably controlled to edge a lens based on said data. All of the gathered data might be thus used for highly accurately defining the lens shape such that it is adapted to perfectly fit into a frame groove of a spectacle frame.

In a preferred embodiment, the system may further comprise an indicator for indicating or displaying or even for providing the amount or data representing the amount of extension of the probe in the extension position with respect to the retracted position or distal end tip portion. The displaying of data might be used for a more manual or semi-automatic process, while the provision of data could also be used for a more automated process.

According to another aspect, the present invention also relates to a method for defining a lens shape for a machined lens adapted to fit into a frame groove of a spectacle frame. The method comprises the following steps:
  a) Determining a frame groove periphery at a bottom of a frame groove of a spectacle frame,
  b) Providing a lens edge simulation tool, preferably according to any one of claims 1 to 5, having a defined edge profile comprising a bevel portion protruding towards a protrusion direction, wherein the bevel portion comprises a probe at a distal end tip portion of the bevel portion and being moveable along the protrusion direction between a retracted position in which the probe does not protrude from the defined edge profile and an extension position in which the probe protrudes from the distal end tip portion,
  c) Introducing the lens edge simulation tool with its bevel portion and the probe into the frame groove at least at one position along the frame groove periphery so that the lens edge simulation tool rests on the spectacle frame in the protrusion direction and the probe rests on (i.e. on or closest possible to) the bottom of the frame groove,
  d) Determining an offset of the so introduced lens edge simulation tool with respect to the frame groove based on the extension position of the probe with respect to the retracted position or distal end tip portion, and
  e) Determining a lens edge periphery for a machined lens based on the frame groove periphery in conjunction with the determined offset, preferably based on the frame groove periphery compensated by a shape compensation value based on or derived from the amount of offset.

With said method it is possible to accurately define a corresponding offset to thus more accurately define the resulting lens edge periphery for a lens to be machined. Due to the use of a corresponding lens edge simulation tool, the whole method can be much more simplified compared to the known methods requiring complex algorithms and devices.

Also, the present method allows for a more reliable process due as its comparably simple layout is much less prone to failure. The method is easy and reliable to measure a shape compensation or lens edge periphery ready to use in presence of different edger machines and tracers; and all of this without the use of a complex tracer device programmed with a proper and complex computer calculation. The determination of the lens edge periphery based on the frame groove periphery traced by a tracer in conjunction with the determined offset measured by the lens edge simulation tool allows for creating a lens with a proper size considering all aspects to fit into the spectacle frame at the first attempt (this is also called "First Fit" in the language of optical laboratories or shops).

The lens edge simulation tool and the frame groove (i.e. the spectacle frame) could—at least in step c)—be relatively tilted with respect to each other, preferably relatively and freely tilted with respect to each other, to align them and preferably their planes of osculation; this even more preferred in a tilt position in which the determined offset is minimum and/or in which the lateral portions restrict the tilt angle relative to the spectacle frame due to (physical) contact between them and preferably substantially symmetrical (physical) contact between them in side view of the lens edge simulation tool. This relatively tiltable arrangement or support of the lens edge simulation tool with respect to the frame groove allows for an exact measurement of the lens edge periphery under consideration of even tilted or inclined sections of the spectacle frame (groove) like, for instance, for bend spectacle frames and lenses. The process of the frame and/or lens edge simulation tool being freely tilted to follow the natural inclination of the frame groove (i.e. bezel) allows for a reliable measurement even in case of wrapped sports frames.

The method according to the present invention may further comprise the following step:
  f) Machining the lens with an edger machine based on the determined lens edge periphery so that the machined lens fits into the frame groove of the spectacle frame.

In other words, the data and—in particular the data representing the determined lens edge periphery—can thus be easily used for a corresponding edger machine to thus machine a corresponding lens having a most accurate lens shape with respect to a frame groove of a spectacle frame to thus perfectly fit therein. The lens edge periphery data can be provided to the edger machine via the control unit (e.g. automatically) or it can also be manually provided to the edger machine.

Steps b) to e) (or at least one or some of which) and preferably also step a) might be performed on a computer, wherein the computer provides the determined data, particularly the lens edge periphery, preferably to edger machine for performing step f). The present method thus can be a completely or partially digital operation. For instance, it may create a 3D model of the spectacle frame and the lens edge simulation tool and the computer runs the simulation as described herein above to receive the lens edge periphery data. Alternatively, all steps or at least parts of the steps are performed on a system according to the present invention.

Further advantages and specific features will now be described with respect to the drawings of the accompanied Figures, according to which:

DETAILED DESCRIPTION OF THE PREFERRED EMBODIMENTS

Figure 1:
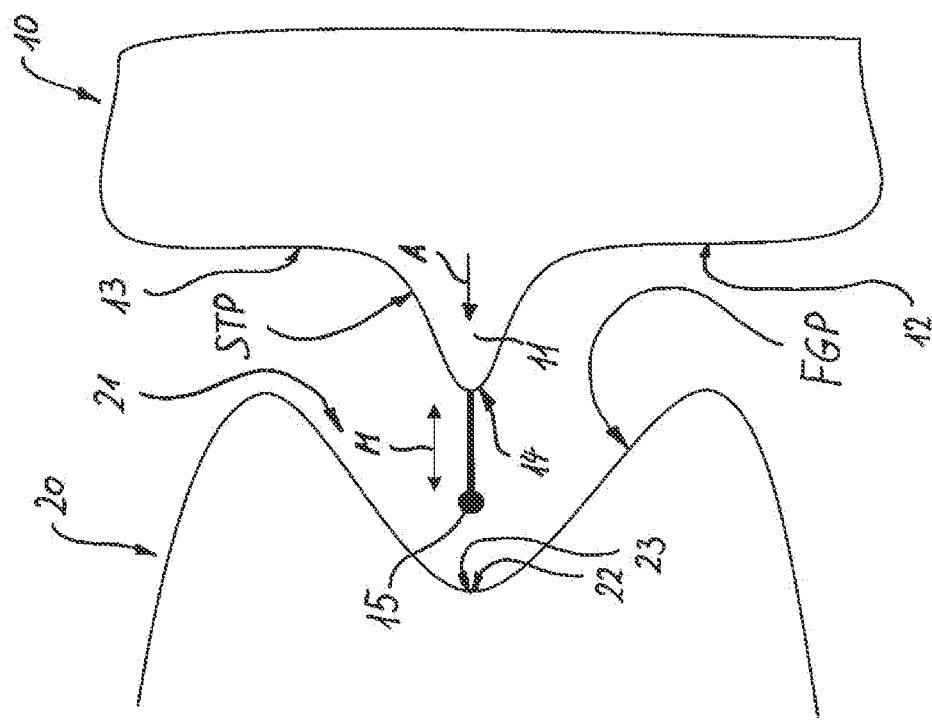
FIG. 1 is a schematic side view of a lens edge simulation tool according to the present invention and a frame groove of a spectacle frame before being introduced.

The Figures show a lens edge simulation tool 10 for measuring the fitment of a lens edge profile with respect to a frame groove profile FGP of a spectacle frame 20. As can be best seen in FIGS. 1 and 2, the lens edge simulation tool 10 has a defined edge profile STP like a lens edge profile LEP of a lens 6 being machined by a defined edger machine 4. Therefore, the edger machine 4 usually has a defined edging profile or groove 40 which corresponds to the lens edge profile LEP to be obtained for fitment thereof into a frame groove 21 of the spectacle frame 20.

The defined edge profile STP comprises a bevel portion 11 protruding towards a protrusion direction A. As can be best seen in FIGS. 1 to 4, the bevel portion 11 preferably tapers towards the protrusion direction A; here in a V-shape. Moreover, the defined edge profile STP may further comprise two lateral portions 12, 13 each facing towards the protrusion direction A and extending at opposite sides of the bevel portion 11 and away from one another. In a preferred embodiment, the lateral portions 12, 13 extend substantially orthogonal with respect to the protrusion direction A. Such a defined edge profile STP thus represents the whole lens edge profile LEP even of a thick lens L to be machined of which the resulting bevel portion 61 protrudes in a region between an upper and lower or inner and outer side I, O of the lens 6 with respect to its thickness. Such a layout thus allows for a most accurate representation of a lens edge profile LEP and thus a more accurate measurement by use of the lens edge simulation tool 10 according to the present invention.

The lens edge simulation tool 10 further comprises a probe 15 provided at a distal end tip portion 14 of the bevel portion 11 and being moveable M along the protrusion direction A between a retracted position (see dotted lines in FIGS. 1 and 2) in which the probe 15 does not protrude from the defined edge profile STP and an extension position (see, e.g., the positions in FIGS. 1 and 2) in which the probe 15 protrudes from the distal end tip portion 14.

The probe 15 may have the same dimensions like a tracer pin 30 of a tracer 3 for determining a frame groove periphery 22 of the spectacle frame 20. In particular, the probe 15 may preferably have the same shape and/or size like such a tracer pin 30. In a most preferred embodiment, the probe 15 can even be identical to such a tracer pin 30.

As can be best seen in FIGS. 1 to 4, the probe 15 may have a spherical shape. The probe 15 may also have a partially spherical or hemispherical or even just a rounded shape. Preferably, the probe 15 may have a diameter D of about 0.1 to 4 mm and more preferred of about 0.2 to 2 mm or any other dimension.

The probe 15 is preferably biased towards the extension position or protrusion direction so that it always tends to be moved towards the extension position and thus always lies in abutment when being in use for measuring the fitment of a lens edge profile LEP with respect to a frame groove profile FGP of a spectacle frame 20.

The probe 15 could also be releasably provided to the defined edge profile STP or its bevel portion 11, which allows the lens edge simulation tool 10 to be adapted to any possible tracer 3 or tracer pin 30 layout for highly accurate measurements, e.g. by simple replacement of the probe 15.

Figure 5:
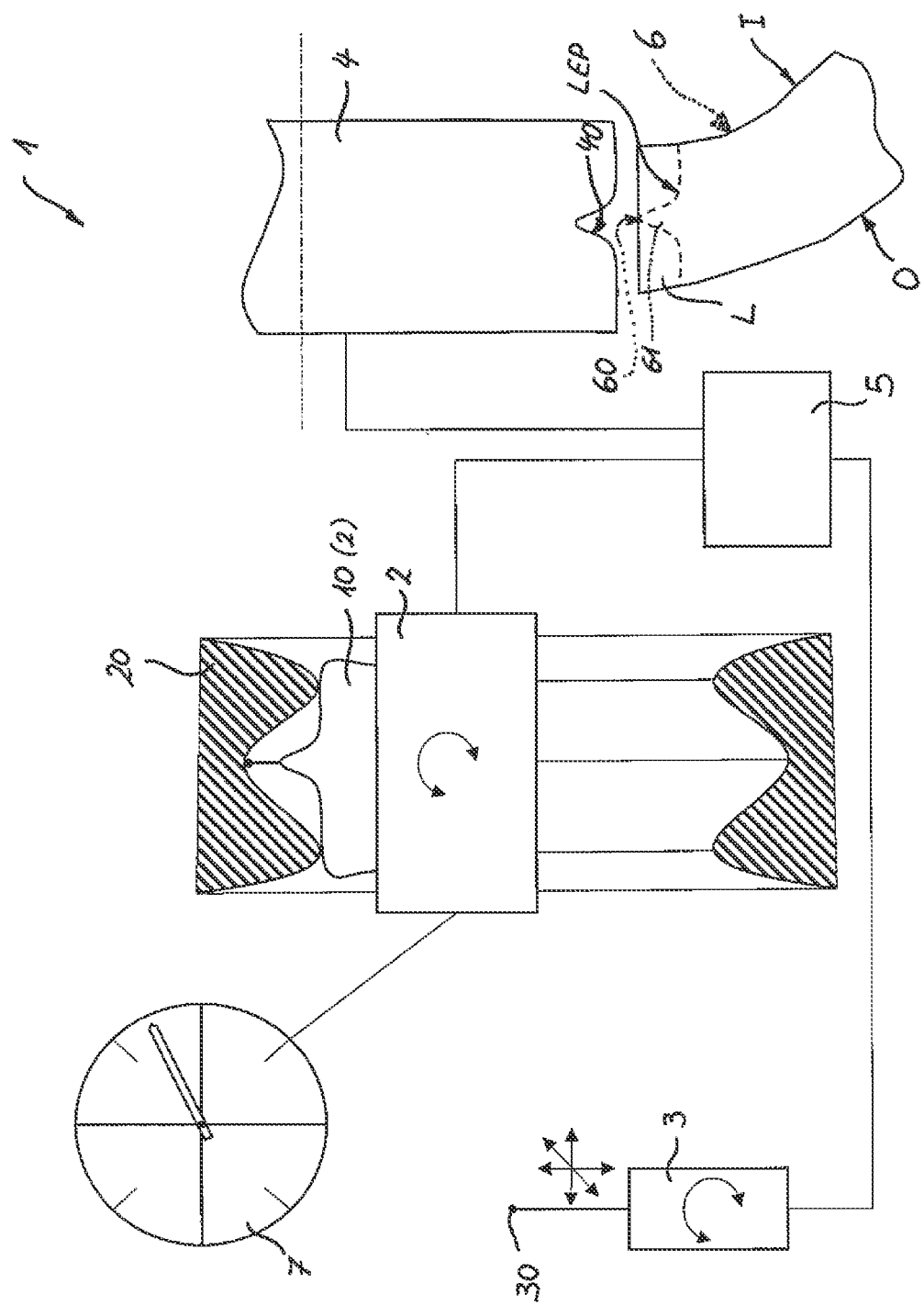
FIG. 5 shows a schematic partially cut side view of a system according to the present invention having a lens edge simulation tool according to FIG. 1.

FIG. 5 shows a system 1 according to the present invention for defining a lens shape for a machined lens 6 adapted to fit into a define frame groove 21 of a spectacle frame 20. The system 1 comprises a holder 2 for holding the spectacle frame 20. The holder 2 can be a separate holding means while it can also or additionally be provided by the lens edge simulation tool 10 itself, the latter being also part of the system 1. As shown, the lens edge simulation tool 10 as the holder 2 is arranged here in a horizontal orientation to thus receive the spectacle frame from an upper side and thus supporting the spectacle frame 20. For secure fitment, the holder 2 may further comprise an upper clamping portion (not shown) to bring the spectacle frame 20 in secure abutment with the lens edge simulation tool 10. The lens edge simulation tool 10 is provided such that it can be introduced with its bevel portion 11 into the frame groove 21 of the spectacle frame 20 held by the holder (here supported by the lens edge simulation tool 10 as the holder 2) at least at one position—namely preferably in a static manner— along the frame groove periphery 22 so that the lens edge simulation tool 10 rests on the spectacle frame 20 in the protrusion direction A and the probe 15 rests on the bottom 23 of the frame groove 21.

Figure 4:
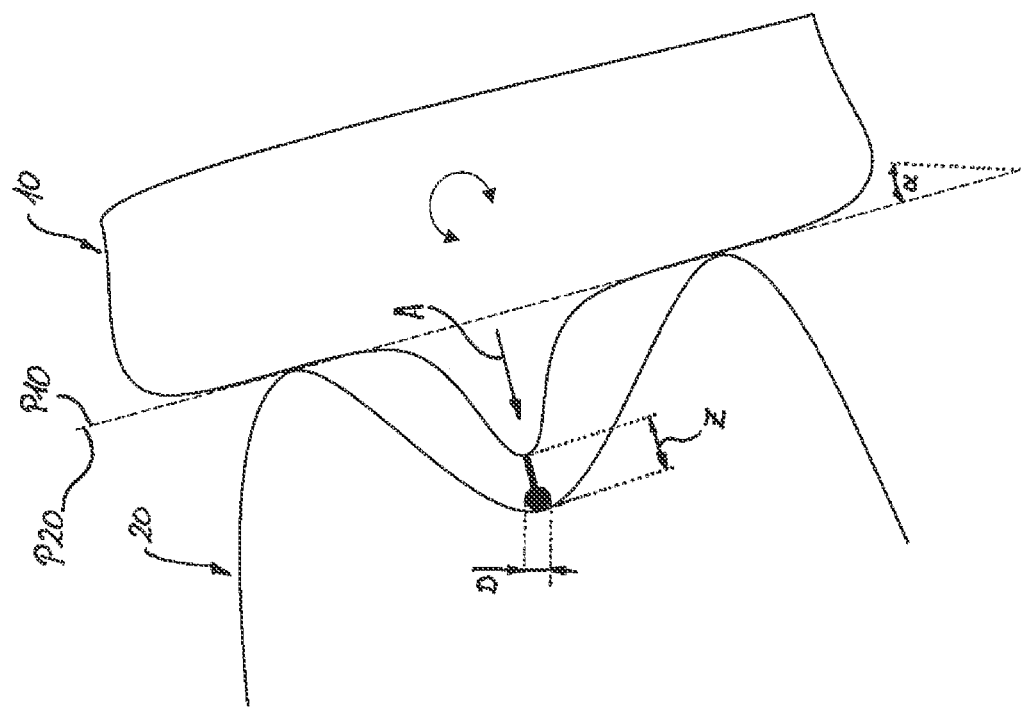
FIG. 4 shows the features of FIG. 3 in a measuring position of the lens edge simulation tool being inserted into the frame groove profile of the spectacle frame.
Figure 3:
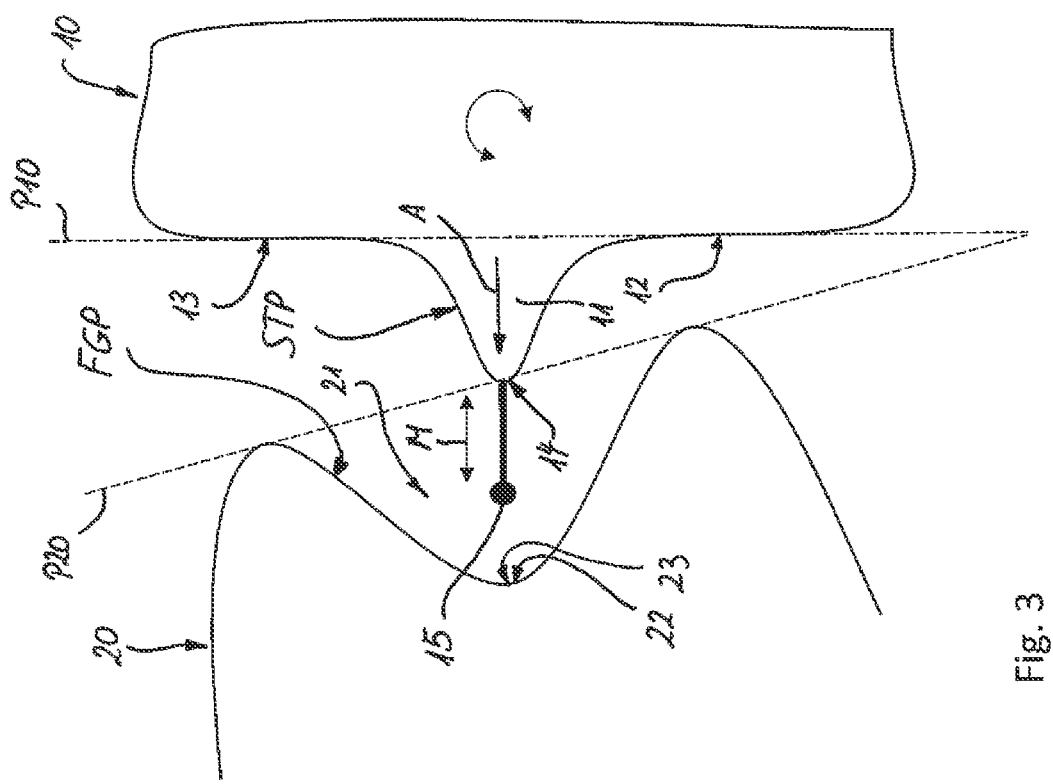
FIG. 3 is a schematic side view of a lens edge simulation tool according to the present invention and a frame groove of another spectacle frame before being introduced.

As also indicated in FIG. 5 and clearly shown in FIGS. 3 and 4, the lens edge simulation tool 10 can be supported in a tiltable manner and most preferably in a freely tiltable manner. Even more preferred, the lens edge simulation tool 10 is (freely) tiltable at least about an axis extending orthogonally through the protrusion direction A in side view of the lens edge simulation tool 10 and preferably also orthogonal to the extension direction of the lateral portions 12, 13 as depicted in FIGS. 3 and 4. Such a tiltable support is exemplarily depicted in FIGS. 3 to 5 by a corresponding circular arrow.

Again turning to FIG. 5, the system 1 may further comprise a tracer 3 for determining the frame groove periphery 22 at a bottom 23 of the frame groove 21 of the spectacle frame 20. Therefore, a separate tracer 3 can be used as shown in FIG. 5, which might then require a separate holder for holding the spectacle frame 20 during the tracer measurement. However, it is also possible that the tracer 3 can use the holder 2 of the system 1 for its measurement; in this case, it would be preferred if the holder 2 is not (only) represented by the lens edge simulation tool 10 but preferably as a separate element. For measurement, the tracer 3 is provided such that it can determine the frame groove periphery 22 by relative movement of the tracer 3 with respect to the holder 2 (or a separate holder) or the spectacle frame 20. In FIG. 5 there is shown an example for potential degrees of freedom by corresponding arrows, while the application is not limited thereto. In a preferred embodiment, the tracer 3 may comprise a tracer pin 30 configured to rest at the bottom 23 of the frame groove 21 during determination of the frame groove periphery 22 and more preferred during the relative movement. The probe 15 and the tracer pin 30 preferably have the same shape and/or size and are more preferably identical so that the tracer pin 30 may also have the dimensions as already mentioned herein above for the probe 15. This allows for an exact and highly accurate measurement result, which is also easily comparable. Alternatively or additionally it may also be possible that the tracer 3 comprises a camera for visually determining the frame groove periphery 22 or frame groove profile FGP (from which the frame groove periphery 22 may be derived).

The system 1 may further comprise an edger machine 4 having an edging profile 40 for machining the defined lens edge profile LEP. The edging profile 40 thus preferably has a contour which corresponds to the contour of the lens edge simulation tool 10, i.e. its defined edge profile STP.

The system 1 may further comprise a control unit 5 preferably for controlling the holder 2 or even the holder of the tracer 3, the lens edge simulation tool 10, the tracer 3, and/or the edger machine 4. In a preferred embodiment, the control unit 5 is configured for controlling a relative movement of the holder 2 with respect to the lens edge simulation tool 10 and/or the tracer 3. Moreover, the control unit 5 may also be configured for controlling a relative movement of a lens to be machined with respect to the edger machine 4.

Figure 2:
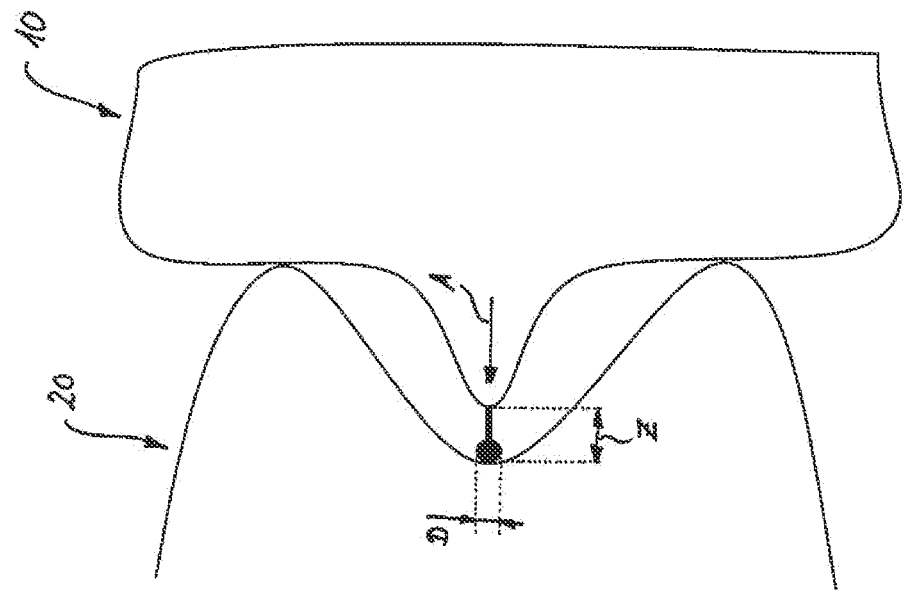
FIG. 2 shows the features of FIG. 1 in a measuring position of the lens edge simulation tool being inserted into the frame groove profile of the spectacle frame.

Moreover, the control unit 5 may further be configured to provide and/or determine data, like a lens shape compensation value, representing an offset Z of the lens edge simulation tool 10 introduced in the frame groove 21 with respect to the bottom 23 of the frame groove 21 based on the extension positon of the probe 15 with respect to the retracted position or distal end tip portion 14 (see FIGS. 2 and 4). This data is preferably based on data received from the lens edge simulation tool 10.

The control unit 5 may further be configured to provide and/or determine also data representing the frame groove periphery 22 preferably based on data received from the tracer 3.

Moreover, the control unit 5 may further be configured to provide and/or determine also data representing a lens edge periphery 60 of a machined lens 6 preferably based on the frame groove periphery 22 in conjunction with determined offset Z or shaped compensation value and preferably also based on data representing the relative tiltable angle α of the lens edge simulation tool 10; preferably with respect to a defined default orientation.

The control unit 5 is preferably also configured to provide said data to the edger machine 4 for controlling the edger machine 4 to machine a lens L based on said data to thus receive the required machined lens 6 for accurate fitment into the spectacle frame 20.

As can also be seen in FIG. 5, the system 1 may further comprise an indicator 7 for indicating or displaying or providing the amount or data representing the amount of extension of a probe 15 in the extension position with respect to the retracted position or distal end tip portion 14, which represents the offset Z or forms the basis to determine a required offset. The indicator 7 can be a gauge or indicating instrument (see FIG. 5) or a computer display or any other indication or displaying means.

In the following, a method for defining a lens shape for a machined lens 6 adapted to fit into a frame groove 21 of a spectacle frame 20 is described.

In a first step, a frame groove periphery 22 is determined at a bottom 23 of a frame groove 21 of a spectacle frame 20. Therefore, any known tracer or the tracer 3 of the system 1 can be used.

In a second step, a lens edge simulation tool 10 is provided, having a defined edge profile STP comprising a bevel portion 11 protruding towards a protrusion direction A, wherein the lens edge simulation tool 10 comprises a probe 15 provided at a distal end tip portion 14 of the bevel portion 11 and being moveable along the protrusion direction A between a retracted position in which the probe 15 does not protrude from the defined edge profile STP and an extension position in which the probe 15 protrudes from the defined edge profile STP or the distal end tip portion 14. The lens edge simulation tool 10 is preferably a physical lens edge simulation tool 10 according to the present invention but may also be simulated on a computer in case of a computer-implemented invention.

In a third step, the lens edge simulation tool 10 is introduced with its bevel portion 11 and the probe 15 into the frame groove 21 at least at one position along the frame groove periphery 22—i.e. preferably in a static manner—so that the lens edge simulation tool 10 rests on the spectacle frame 20 in the protrusion direction A and the probe 15 rests on the bottom 23 of the frame groove 21. Even though the probe 15 may also be moved along the frame groove 21, it is generally sufficient for an accurate measurement by the lens edge simulation tool 10 to be positioned in a static manner at at least one or a defined number (2, 3, 4, 5, or more) static positions along the frame groove 21 or frame groove periphery 22.

In a fourth step, an offset of the so introduced lens edge simulation tool 10 is determined with respect to the frame groove 21 based on the extension position of the probe 15 with respect to the retracted position or distal end tip portion 14.

In a fifth step, a lens edge periphery 60 for a machined lens 6 is determined based on the frame groove periphery 22 in conjunction with the determined offset Z, preferably based on the frame groove periphery 22 compensated by a shape compensation value based on or derived from the amount of offset Z.

The lens edge simulation tool 10 and the frame groove 21 are relatively tilted with respect to each other, preferably relatively and freely tilted with respect to each other, to align them, i.e. preferably to align their planes of osculation P10, P20, more preferred in a tilt position in which the determined offset Z is minimum (see FIG. 4) and/or in which the lateral portions 12, 13 restrict the tilt angle α (preferably with respect to a defined default orientation) relative to the spectacle frame due to (physical) contact between them, preferably substantially symmetrical (physical) contact between them in side view of the lens edge simulation tool 10.

The method may comprise a sixth step of machining the lens L with an edger machine 4 based on the determined lens edge periphery 60 so that the machined lens 6 fits into the frame groove 21 of the spectacle frame 20.

The second to fifth step (or just one or some thereof) and preferably also the first step can be performed on a computer (e.g. by means of or on the control unit 5), wherein the computer provides the determined data, particularly the lens edge periphery 60, preferably to an edger machine 4 for performing the sixth step. It may also be possible that all or at least some of the steps of the present method are performed on a system 1 according to the present invention.

The present invention is not limited by the embodiments described herein above as long as being covered by the appended claims. All of the features described herein above in the embodiments can be combined and/or replaced in any given manner.

The invention claimed is:

1. A lens edge simulation tool for measuring the fitment of a lens edge profile with respect to a frame groove profile of a spectacle frame, the lens edge simulation tool having a defined edge profile like a lens edge profile of a lens being machined by a defined edger machine, the defined edge profile comprising a bevel portion protruding towards a protrusion direction (A), wherein the lens edge simulation tool further comprises a probe integrated in the bevel portion and provided at a distal end tip portion of the bevel portion and being axially moveable with respect to the bevel portion along the protrusion direction between a retracted position in which the probe does not protrude from the defined edge profile and an extension position in which the probe protrudes from the distal end tip portion.

2. The lens edge simulation tool according to claim 1, wherein the defined edge profile further comprises two lateral portions each facing towards the protrusion direction and extending at opposite sides of the bevel portion and away from one another.

3. The lens edge simulation tool according to claim 1, wherein the probe has the same dimensions like a tracer pin of a tracer for determining a frame groove periphery or wherein the probe has a spherical or partially spherical or hemispherical or rounded shape.

4. The lens edge simulation tool according to claim 1, wherein the probe is biased towards the extension position, and/or wherein the probe is releasably provided to the defined edge profile.

5. The lens edge simulation tool according to claim 1, wherein the bevel portion tapers towards the protrusion direction (A).

6. A system for defining a lens shape for a machined lens adapted to fit into a frame groove of a spectacle frame, comprising:

a holder for holding a spectacle frame, a lens edge simulation tool according to claim 1 and provided such that it can be introduced with its bevel portion and probe into a frame groove of the spectacle frame held by the holder at least at one position along a frame groove periphery.

7. The system according to claim 6, wherein the lens edge simulation tool is supported in a tiltable manner at least about an axis extending orthogonally to the protrusion direction in side view of the lens edge simulation tool.

8. The system according to claim 6, further comprising a tracer for determining the frame groove periphery at a bottom of the frame groove of the spectacle frame being held by the holder by relative movement of the tracer with respect to the holder or spectacle frame, wherein the tracer comprises a camera, or wherein the tracer comprises a tracer pin configured to rest at the bottom of the frame groove during determination of the frame groove periphery during the relative movement.

9. The system according to claim 6, further comprising an edger machine having an edging profile for machining the defined lens edge profile, wherein the edging profile comprises a groove representing the negative layout or contour of the lens edge profile to be machined.

10. The system according to claim 6, further comprising a control unit for controlling the holder and/or the lens edge simulation tool and/or the edger machine for controlling a relative movement of the holder with respect to the lens edge simulation tool and/or a tracer for determining a frame groove periphery.

11. The system according to claim 10, wherein the control unit is configured to provide and/or determine data, like a lens shape compensation value, representing an offset of the lens edge simulation tool introduced in the frame groove with respect to a bottom of the frame groove based on the extension position of the probe with respect to the retracted position or distal end tip portion based on data received from the lens edge simulation tool, and also data representing the frame groove periphery, and/or also data representing a lens edge periphery of a machined lens based on the frame groove periphery in conjunction with the determined offset or shape compensation value and also based on data representing the relative tiltable angle $\alpha$ of the lens edge simulation tool, wherein the control unit is configured to provide said data to the edger machine to control the edger machine to machine a lens based on said data.

12. A method for defining a lens shape for the machined lens adapted to fit into a frame groove of a spectacle frame, comprising the steps of:

a) Determining a frame groove periphery at a bottom of the frame groove of the spectacle frame, b) Providing the lens edge simulation tool, according to claim 1, having the defined edge profile comprising the bevel portion protruding towards the protrusion direction, wherein the lens edge simulation tool comprises the probe provided at the distal end tip portion of the bevel portion and being moveable along the protrusion direction between the retracted position in which the probe does not protrude from the defined edge profile and an extension position in which the probe protrudes from the distal end tip portion, c) Introducing the lens edge simulation tool with its bevel portion and probe into the frame groove at least at one position along the frame groove periphery so that the lens edge simulation tool rests on the spectacle frame in the protrusion direction and the probe rests on the bottom of the frame groove, d) Determining an offset of the so introduced lens edge simulation tool with respect to the frame groove based on the extension position of the probe with respect to the retracted position or distal end tip portion, and e) Determining a lens edge periphery for the machined lens based on the frame groove periphery in conjunction with the determined offset, based on the frame groove periphery compensated by a shape compensation value based on or derived from the amount of offset.

13. The method according to claim 12, wherein the lens edge simulation tool and the frame groove are relatively and freely tilted with respect to each other, to align them and preferably their planes of osculation, in a tilt position in which the determined offset is minimum and/or in which lateral portions restrict the tilt angle $\alpha$ relative to the spectacle frame due to contact between them.

14. The method according to claim 12, further comprising the following step:

f) Machining the lens with the edger machine based on the determined lens edge periphery so that the machined lens fits into the frame groove of the spectacle frame.

15. The method according to claim 14, wherein at least steps b) to e) are performed on a computer, wherein the computer provides the lens edge periphery to an edger machine for performing step f).

16. The lens edge simulation tool according to claim 3, wherein the probe has a diameter D of 0.1 to 4 mm.

17. The system according to claim 8, wherein the probe and the tracer pin have the same shape or size.

18. The system according to claim 10, wherein the control unit further controls a relative movement of a lens to be machined with respect to the edger machine.

19. The method according to claim 13, wherein the lens edge simulation tool and the frame groove are relatively and freely tilted with respect to each other, to align them and their planes of osculation in a tilt position in which the lateral portions restrict the tilt angle $\alpha$ relative to the spectacle frame due to substantially symmetrical contact between them in side view of the lens edge simulation tool.

20. The method according to claim 14, wherein all steps are performed on a system for defining a lens shape for a machined lens adapted to fit into a frame groove of a spectacle frame, comprising:

a holder for holding a spectacle frame, a lens edge simulation tool provided such that it can be introduced with its bevel portion and probe into a frame groove of the spectacle frame held by the holder at least at one position along a frame groove periphery, wherein the lens edge simulation tool measures the fitment of a lens edge profile with respect to a frame groove profile of a spectacle frame, the lens edge simulation tool having a defined edge profile like a lens edge profile of a lens being machined by a defined edger machine, the defined edge profile comprising a bevel portion protruding towards a protrusion direction (A), and wherein the lens edge simulation tool further comprises a probe integrated in the bevel portion and provided at a distal end tip portion of the bevel portion and being axially moveable with respect to the bevel portion along the protrusion direction between a retracted position in which the probe does not protrude from the defined edge profile and an extension position in which the probe protrudes from the distal end tip portion.

* * * * *